United States Patent
Sun et al.

(10) Patent No.: US 11,120,638 B2
(45) Date of Patent: Sep. 14, 2021

(54) DIRECTOR HINT BASED AUTO-CINEMATOGRAPHY

(71) Applicant: TCL RESEARCH AMERICA INC., San Jose, CA (US)

(72) Inventors: Lin Sun, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 19 days.

(21) Appl. No.: 16/727,778

(22) Filed: Dec. 26, 2019

(65) Prior Publication Data

US 2021/0201595 A1 Jul. 1, 2021

(51) Int. Cl.
*G06T 19/20* (2011.01)
*G06T 13/40* (2011.01)
(Continued)

(52) U.S. Cl.
CPC ............ *G06T 19/20* (2013.01); *G06F 3/0486* (2013.01); *G06T 11/206* (2013.01); *G06T 13/40* (2013.01);
(Continued)

(58) Field of Classification Search
CPC ....... G06T 19/20; G06T 11/206; G06T 13/40; G06T 2219/2021; G06T 2200/24;
(Continued)

(56) References Cited

U.S. PATENT DOCUMENTS

| 9,106,812 B1 * | 8/2015 | Price | H04N 21/47205 |
| 2015/0363644 A1 * | 12/2015 | Wnuk | G06K 9/6215 382/103 |

(Continued)

FOREIGN PATENT DOCUMENTS

| CA | 2741461 C | 12/2015 | |
| WO | WO-2009055929 A1 * | 5/2009 | G11B 27/28 |

OTHER PUBLICATIONS

Christie, Marc et al., "Film editing for third person games and machinima", Workshop on Intelligent Cinematography (Year: 2012).*

(Continued)

*Primary Examiner* — Michael Le
(74) *Attorney, Agent, or Firm* — Anova Law Group, PLLC

(57) ABSTRACT

A method of generating video in three-dimensional animation environment is provided. The method includes: obtaining and translating directorial hints for making a 3D animated movie based on user input; determining camera configurations in a 3D environment according to the directorial hints; establishing a camera search space that includes multiple candidate cameras to be used at different timestamps to shoot one or more scenes of the movie based on the camera configurations; performing editing optimization based on the camera search space and the directorial hints, to obtain an edited video. The editing optimization is formalized into a process of finding a path with minimum cost in a graph model, each path describing a candidate camera sequence for producing the movie, and at least some of the directorial hints are translated into cost functions of the graph model. The edited video is output as the produced 3D animated movie.

20 Claims, 7 Drawing Sheets

(51) Int. Cl.
*G06F 3/0486* (2013.01)
*H04N 5/222* (2006.01)
*G06T 11/20* (2006.01)

(52) U.S. Cl.
CPC ....... *H04N 5/2224* (2013.01); *G06T 2200/04* (2013.01); *G06T 2200/24* (2013.01); *G06T 2219/2021* (2013.01); *G06T 2219/2024* (2013.01)

(58) Field of Classification Search
CPC ........ G06T 2200/04; G06T 2219/2024; H04N 5/2224; G06F 3/0486
See application file for complete search history.

(56) References Cited

U.S. PATENT DOCUMENTS

2016/0007058 A1* 1/2016 Wang ................. G06K 9/00744
725/116
2019/0304157 A1* 10/2019 Amer .................. G06N 3/0454

OTHER PUBLICATIONS

Hills et al., "Collaborative Systems for Narrative Construction", Interacting: Art, Research and the Creative. (Year: 2011).*
Felix Kistler et al., "Full Body Gestures Enhancing a Game Book for Interactive Story Telling", International Conference on Interactive Digital Storytelling, pp. 207-218 (Year: 2011).*
Christianson, David B. etal. "Declarative camera control for automatic cinematography", AAAI/IAAI, vol. 1. (Year: 1996).*
Bares, William H., and James C. Lester. "Cinematographic user models for automated real time camera control in dynamic 3D environments", User Modeling, Springer, Vienna, 1997.
Bordwell, David et al., "Film art: An introduction", Chapter 6, pp. 169-209, vol. 7., New York: McGraw-Hill, 1997.
Bowen, Christopher J., "Grammar of the Shot", Routledge, 2013.
Christianson, David B. et al. "Declarative camera control for automatic cinematography", AAAI/IAAI, vol. 1, 1996.
Christie, Marc et al., "Film editing for third person games and machinima", 2012.
Doron Friedman and Yishai Feldman: Knowledge-Based Cinematography and Its Applications. In R.López de Mantaras and L.Saitta (eds.): ECAI2004, Proceedings of the 16th European Conference on Artificial Intelligence, IOS Press, Amsterdam, 2004.
Elson, David K., and Riedl, Mark O., "A lightweight intelligent virtual cinematography system for machinima production", 2007.
Galvane, Quentin, "Automatic Cinematography and Editing in Virtual Environments", Diss, Grenoble Alpes, 2015.
Christophe Lino et al., "Computational Model of Film Editing for Interactive Storytelling", International Conference on Interactive Digital Storytelling, 2011.
Lino, Christophe, and Marc Christie, "Efficient composition for virtual camera control." Proceedings of the ACM SIGGRAPH/Eurographics Symposium on Computer Animation, Eurographics Association, 2012.
Markowitz, Daniel et al., "Intelligent camera control using behavior trees", International Conference on Motion in Games, Springer, Berlin, Heidelberg, 2011.
B. Merabti et al., "A Virtual Director Using Hidden Markov Models", Computer Graphics Forum, vol. 35, No. 8, pp. 51-67, The Eurographics Association and John Wiley & Sons Ltd., 2016.
Murch, Walter, "In the Blink of an Eye", 2001.
Rabiger, Michae, "Directing: Film Techniques And Aesthetics", 4th edition, Burlington, 2008. Part 1.
Rabiger, Michae, "Directing: Film Techniques And Aesthetics", 4th edition, Burlington, 2008. Part 2.
Barry Salt, "Speeding up and slowing down", Measurement Theory, Cinemetrics Studies, 2010, Retrieved from www.cinemetrics.lv/salt_speeding_up_down.php.
Tomlinson, Bill et al., "Expressive autonomous cinematography for interactive virtual environments", 2000.

* cited by examiner

DIRECTOR HINT BASED AUTO-CINEMATOGRAPHY

FIELD OF THE DISCLOSURE

The present disclosure relates to the field of computer graphics technologies and, more particularly, relates to director hint based auto-cinematography.

BACKGROUND

Recently, with the thriving of computer graphic technologies, virtual cinematic production has become an emerging field in the entertainment industry. Camera configuration in movie making is time-consuming and requires a tremendous amount of expertise knowledge in the field, which raises the difficulty threshold for amateur movie makers. In attempts to replace this manual endeavor, researchers have been trying to make cinematography and editing autonomous or semi-autonomous in the last decades. Auto-cinematography tackles the problem of automatically generating videos from three-dimensional (3D) animation environments. Most existing auto-cinematography systems concentrate on making "correct" camera sequence that follows existing cinematic rules, neglecting users' willingness to communicate with the systems, therefore auto-generated videos in existing technologies lack diversity and cannot fully meet expectations of users or express users individualized visions.

Stylization according to directorial input makes a film unique. However, stylization requires users to modify delicate details to achieve subjective goals. Amateurs have limited experience for embedding directorial ideas in movie making processes, thus there is a need for a tool enabling autonomous cinematography that reflects a user's ideas. The disclosed method and system are directed to solve one or more problems set forth above and other problems.

BRIEF SUMMARY OF THE DISCLOSURE

One aspect of the present disclosure provides a method of generating video in three-dimensional animation environment. The method includes: obtaining and translating directorial hints for making a 3D animated movie based on user input; determining camera configurations in a 3D environment according to the directorial hints; establishing a camera search space that includes multiple candidate cameras to be used at different timestamps to shoot one or more scenes of the movie based on the camera configurations; performing editing optimization based on the camera search space and the directorial hints, to obtain an edited video. The editing optimization is formalized into a process of finding a path with minimum cost in a graph model, each path in the graph model describing a candidate camera sequence for producing the movie, and at least some of the directorial hints are translated into cost functions of the graph model. The edited video is output as the produced 3D animated movie.

Another aspect of the present disclosure provides a device of generating video in three-dimensional animation environment, including a memory and a processor coupled to the memory. The processor is configured to perform: obtaining and translating directorial hints for making a 3D animated movie based on user input; determining camera configurations in a 3D environment according to the directorial hints; establishing a camera search space that includes multiple candidate cameras to be used at different timestamps to shoot one or more scenes of the movie based on the camera configurations; performing editing optimization based on the camera search space and the directorial hints, to obtain an edited video. The editing optimization is formalized into a process of finding a path with minimum cost in a graph model, each path in the graph model describing a candidate camera sequence for producing the movie, and at least some of the directorial hints are translated into cost functions of the graph model. The edited video is output as the produced 3D animated movie.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a method and apparatus for auto-cinematography. Auto-cinematography, as used herein, refers to an automatic or semi-automatic process in video generation (e.g., movie making, and virtual cinematic production in a 3D environment) that involves camera placing, camera motion planning, and/or video editing. A user, as used herein, may refer to a user of the system that inputs/enters director hints to produce a desired movie/film/video, i.e., the director of the movie. A viewer, as used herein, may refer to people that watches the movie, i.e., the audience of the movie. The movie is formed by a plurality of scenes in sequence describing a series of actions/events, each scene may be shot by a camera (e.g., virtual camera placed in the 3D environment). Apparently, different camera settings can be used to shoot a same scene. In addition, certain scenes produced/shot by cameras in a preparation stage may not be included in the final movie based on the disclosed editing optimization scheme. A camera sequence of a video, as used herein, may refer to chronologically-listed sequence of configurations of cameras that shot the scenes included in the video. The camera sequence can specify, for example, where to place the camera to shoot the scene, what settings (e.g., shot size and angle) to use when shooting the scene, how long is the time duration of this shot (e.g., how many unit time lengths), etc. Further, an action list, as used herein, may refer to a list that annotates what event happens at what time based on the script/storyline of the movie. The configurations of a camera shooting a scene of an event in the action list may be adjusted based on annotated directorial hints in the action list to create desired effect. The disclosed system can, by integrating hints provided by the user/director, produce a movie/video with high quality (e.g., having an optimized camera sequence based on director hints) that enhances viewer experience.

Figure 1:
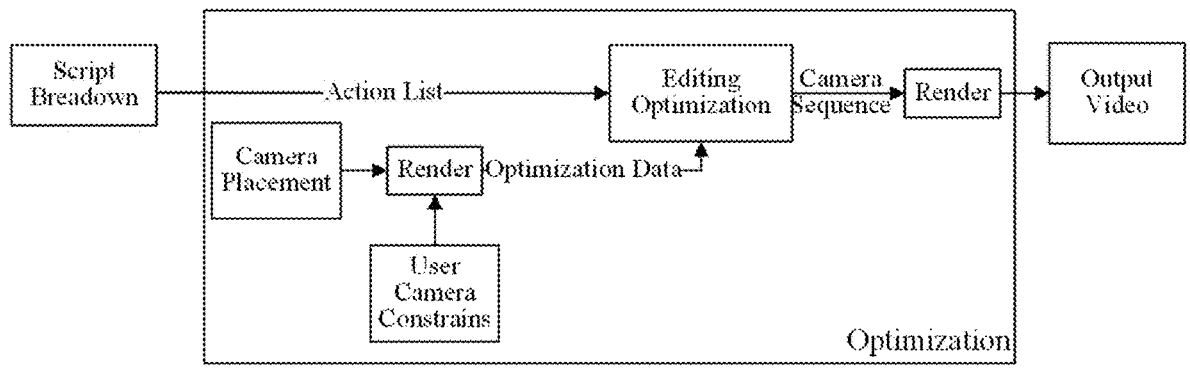
FIG. 1 is a schematic diagram of an auto-cinematography in prior art.

FIG. 1 is a schematic diagram of an auto-cinematography in prior art. Most existing technologies for autonomous cinematography and editing serve as tools to make shots that obey cinematographic axiom, which causes the lack of stylization. Video content produced by most existing auto-cinematography systems is designed to follow film-idioms or certain optimization objectives. In one example, some systems claim to utilize emotion input as one aspect of optimization, but do not mention how human emotion inputs are adjusted during the optimization. In another example, hidden Markov models may be used to learn directorial style and apply the style into video generation: annotated scripts are used as observations and shot specifications are used as hidden states, then this learnt model is applied to generate a new video sequence. However, such system does not communicate with the users for style generation. In auto-cinematography, it is hard to effectively combine the director's inputs with the automatic camera placing and configuration algorithm. This difficulty mainly comes from two aspects. First, the user's subjective willingness in movie-making is difficult to quantify and to be integrated into the optimization algorithm. Secondly, a user-oriented in-depth interactive auto-cinematography framework is not available to allow different levels of user guidance at various stages of the video generation process. As shown in FIG. 1, traditional framework for auto-cinematography is a single forward process without any interface for communicative user input. Users cannot frequently adjust subjective inputs and review the intermediate video output.

Considering some users are not necessarily experts in film-making, the present disclosure provides a system and framework that can absorb and translate user expectations at various stages and levels, repeatedly consider user needs, and offer immediate feedback to the user until a desired movie effect is achieved. The disclosed director-hint based auto-cinematography method and system can encode several user's subjective expectations into camera compositions, camera motions and editing optimization options such that users can feed their ideas into auto-cinematography process without getting deeply into shooting details.

Figure 2:
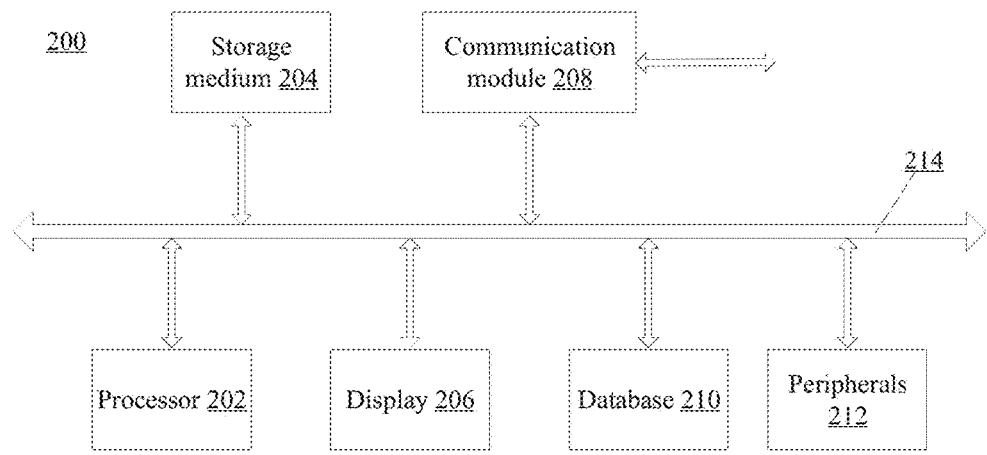
FIG. 2 is a block diagram of an exemplary computing system consistent with the disclosed embodiments.

FIG. 2 shows a block diagram of an exemplary computing system 200 capable of implementing the disclosed auto-cinematography method. As shown in FIG. 2, computing system 200 may include a processor 202, a storage medium 204, a display 206, a communication module 208, a database 210, and peripherals 212, and one or more bus 214 to couple the devices together. Certain devices may be omitted and other devices may be included.

Processor 202 may include any appropriate processor or processors. Further, processor 202 can include multiple cores for multi-thread or parallel processing. Processor 202 may execute sequences of computer program instructions or program modules to perform various processes, such as requesting user input of directorial hints on a graphical user interface, generating/rendering an animated video, translating directorial hints for editing optimization of the animated video, etc. Storage medium 204 may include memory modules, such as ROM, RAM, flash memory modules, and erasable and rewritable memory, and mass storages, such as CD-ROM, U-disk, and hard disk, etc. Storage medium 204 may store computer program instructions or program modules for implementing various processes, when executed by processor 202.

Further, communication module 208 may include network devices for establishing connections through the communication network 102. Database 210 may include one or more databases for storing certain data (e.g., images, videos, animation materials) and for performing certain operations on the stored data, such as database searching and data retrieving.

Display 206 may include any appropriate type of computer display device or electronic device display (e.g., CRT or LCD based devices, touch screens, LED display). Peripherals 212 may include various sensors and other I/O devices, such as speaker, camera, motion sensors, keyboard, mouse, etc.

In operation, the system 200 can perform a series of actions to implement the disclosed auto-cinematography method and framework. The system 200 can implement a terminal or a server, or a combination of both. A terminal, as used herein, may refer to any appropriate user terminal with certain computing capabilities including, e.g., collecting user-entered directorial hints, displaying preview videos, performing editing optimization on a video. For example, a terminal can be a personal computer (PC), a workstation computer, a server computer, a hand-held computing device (tablet), a mobile terminal (a mobile phone or a smartphone), or any other user-side computing device. A server, as used herein, may refer to one or more server computers configured to provide certain server functionalities, such as determining camera configurations for shooting an animated video, generating the animated video based on the camera configurations, editing the animated video by finding a path with minimum cost function in a graph model. The server may also include one or more processors to execute computer programs in parallel. The terminal and/or the server may be configured to provide structures and functions for such actions and operations. In some embodiments, some part of the actions may be performed on the server, and other part of the actions may be performed on the terminal.

Figure 3:
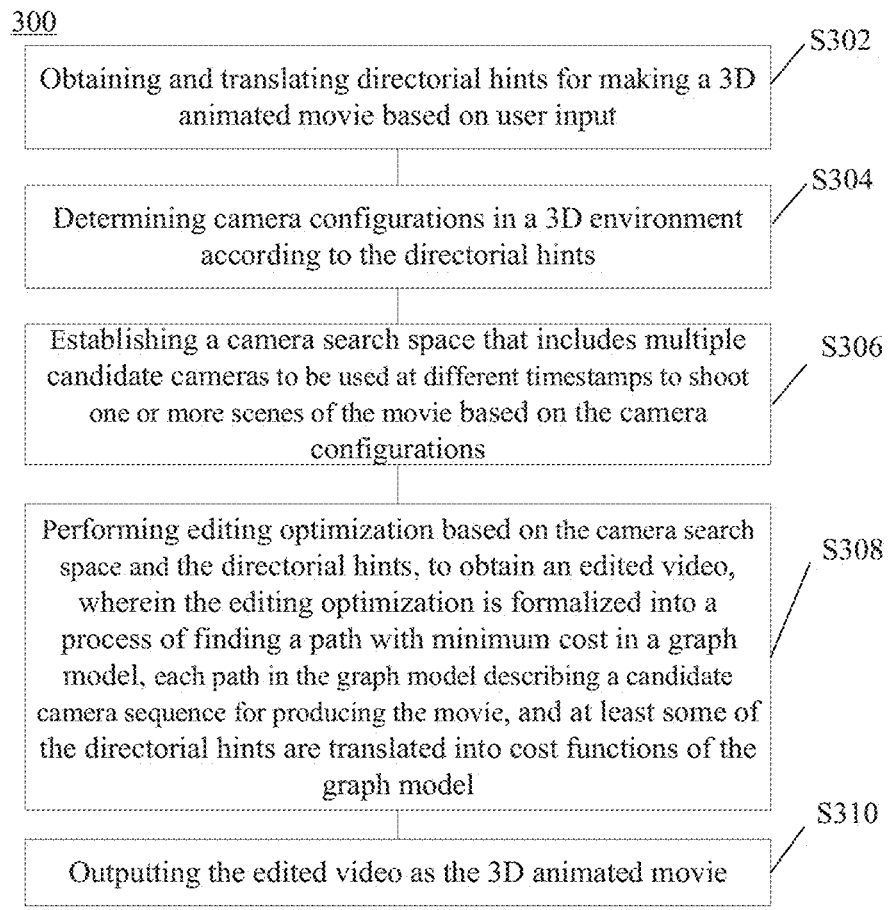
FIG. 3 is a flow chart illustrating an exemplary process of director-hint based auto-cinematography consistent with the disclosed embodiments.
Figure 4:
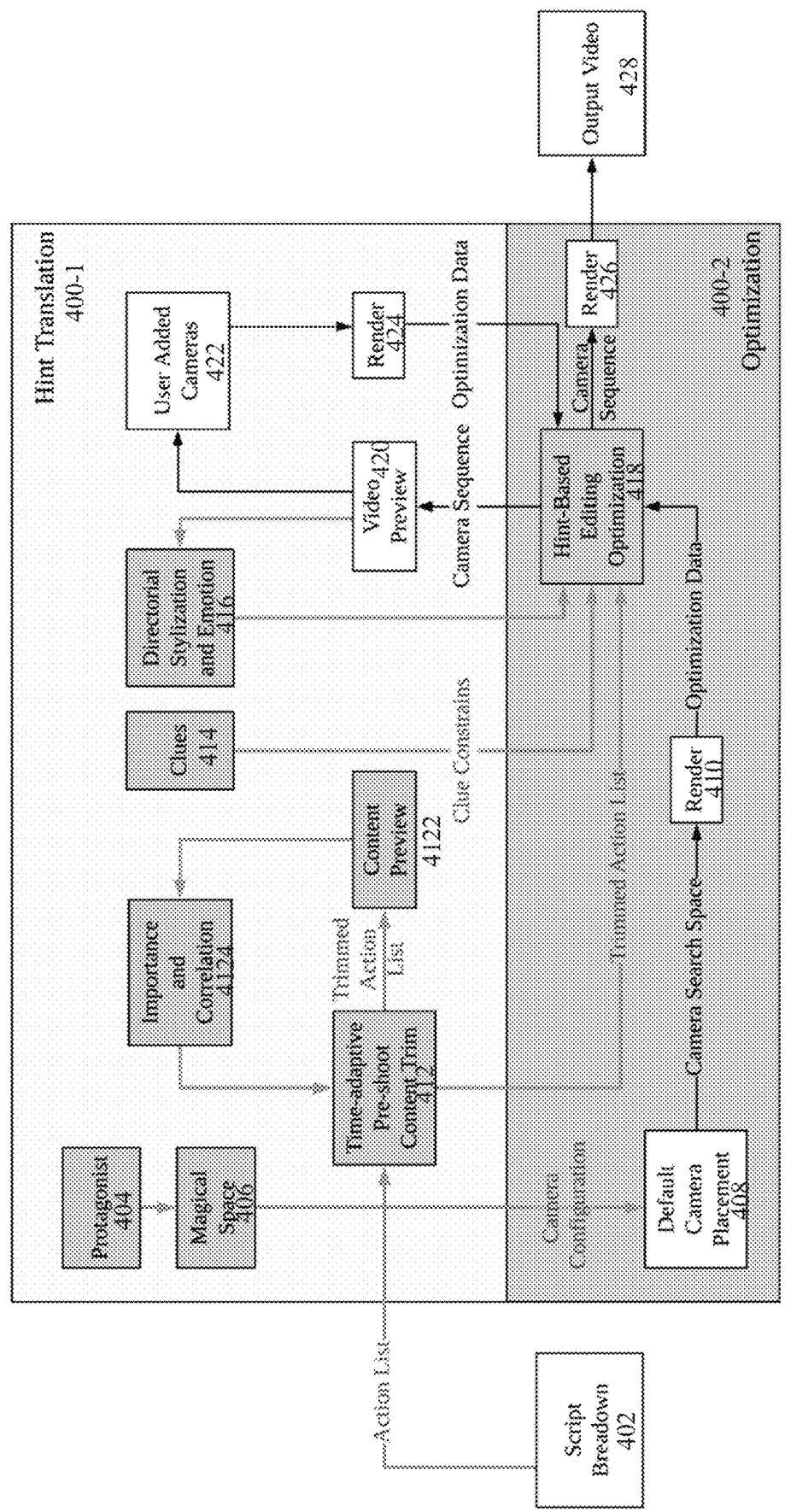
FIG. 4 illustrates an exemplary framework of director-hint based auto-cinematography consistent with the disclosed embodiments.

FIG. 3 is a flow chart illustrating an exemplary process 300 of director-hint based auto-cinematography consistent with the disclosed embodiments; and FIG. 4 illustrates an exemplary framework 400 of director-hint based auto-cinematography consistent with the disclosed embodiments. The exemplary process 300 and the exemplary framework 400 can be implemented by the system 200 (e.g., the processor 202 being configured to execute programs to implement the disclosed functionalities).

As shown in FIG. 3, the disclosed method includes obtaining and translating directorial hints for making a 3D animated movie based on user input (S302). Director hints, or directorial hints, as used herein, refers to information that conveys or translates users' cinematography expectations. The disclosed system can obtain various types of director hints, including at least one of protagonist hint, content trim related hints, clues hint, vibe related hint, directorial style related hint, and/or user add free cameras. A user of the disclosed system can decide whether or not to provide these director hint inputs to impact the movie making. The director hints can affect the automatic-cinematography process at different stages, such as when determining which camera(s) to use to shoot a scene, what camera configuration to be employed to shoot a scene, whether to include certain portions of a shot scene into the final movie, etc.

To translate director hints and ease the cumbersome adjustment process, the disclosed system is configured to provide a set of intuitive graphical interface tools to enter director's input. In some embodiments, these graphical tool set consists three categories: draggable curves, action annotations and multiple choices. Draggable curves are used to collect intensity related parameters. Users do not need to enter intensity values individually for each part of the story and for each type of intensity adjustments. By performing a dragging operation on a dot on the curve, the corresponding intensity values of a sequence of data can be changed. When users are not confident in their decisions, they can mark values for certain part of the curve and leave the rest of the curve untouched. The disclosed system (e.g., a hint translator) can perform reasonable interpolation to fill out the entire curve. Action annotations are inputs from the director/user at action levels. A user can annotate special features to individual action or sequence of actions to present their expectations. Multiple choices are for users to enter character or scene related parameters. Using multiple choices the users can define a categorical value of a character, vibe scheme for a scene, character groups in terms of conflicts, etc.

Hereinafter, types of director hints employed by the disclosed auto-cinematography method and system are introduced, with explanations about their impacts on movie making and their collection mechanisms. Table 1 is an overview of available director hints used in the disclosed system and a possible collection mechanism corresponding to each type of director hint.

TABLE 1

Overview of director hints and collection mechanisms
Director-hint input

| Input type | Curve | Annotation | Multiple Choice |
|---|---|---|---|
| Protagonist | | | X |
| Action Importance | X | | |
| Action Correlation | | X | |
| Clues | | X | |

TABLE 1-continued

Overview of director hints and collection mechanisms
Director-hint input

| Input type | Curve | Annotation | Multiple Choice |
|---|---|---|---|
| Viewer Perceived Intensity | X | | |
| Blink Continuity | | X | |
| Emotional Intensity | X | | |
| Subjective POV | | X | X |
| Conflicts Intensity | X | X | |
| Establish Shot Vibe | | | X |
| Bad Guy Intensity | X | | X |
| Character's Perceived Fear | X | | |
| Handheld Intensity | X | | |

Protagonist: Protagonist is a leading character or one of the major characters in a movie. A protagonist may be the same character persistent throughout the movie, or may be different characters from scene to scene. In order to deepen the expressive power of the protagonist and let the audience clearly recognize the protagonist of the film, the protagonist should be given more complicated camera settings. Using complex camera configurations to capture unimportant characters can easily cause viewer's confusion, and such redundant camera settings reduce the efficiency of optimization at a later stage. Specifying the protagonist in pre-optimization stage can prevent the tendency to concentrate on secondary roles and reduce computation time of the later optimization process. A protagonist can be specified in the disclosed system by, for example, requesting user input on multiple-choice questions at scene-levels.

Content Trim Related Hints: Amateurs may not have a detailed plan for time allocation before filming. Usually initially-produced animation may not need to be completely included in a final movie video, as the animation is a continuous process including repetitive actions, and these repetitive actions are not necessarily meaningful to storytelling. By incorporating content trim related hints, actions that are more important or has higher impact on the story can have higher possibility to be covered while repetitive and dull actions or actions with less impact on the story can be less likely to appear in the final video, or less likely to appear as a complete piece in the final video. The content trim related hints can be specified in the disclosed system by, for example, an intuitive interface having draggable curves for users to enter importance trends for the movie content.

In some embodiments, an action not so important when seen as an individual, can be the cause or the consequence of another crucial action sequence, or it can be the context of a dialogue which cannot be eliminated considering the rationality of the conversation. In these occasions, such action scene, or at least a portion of the action scene, may still be included in the final movie. A user interface can be provided to request users to indicate closely-related actions by annotating them on action lists. For example, users can specify the correlation of actions by annotating them under the same event group to represent the high relevance of these actions, such that the importance curve can be auto-adjusted based on correlation annotation. The correlation annotation can be translated as the input for optimization. In some embodiments, the user can elevate or decrease importance level of certain scenes/actions in the user interface.

Figure 5:
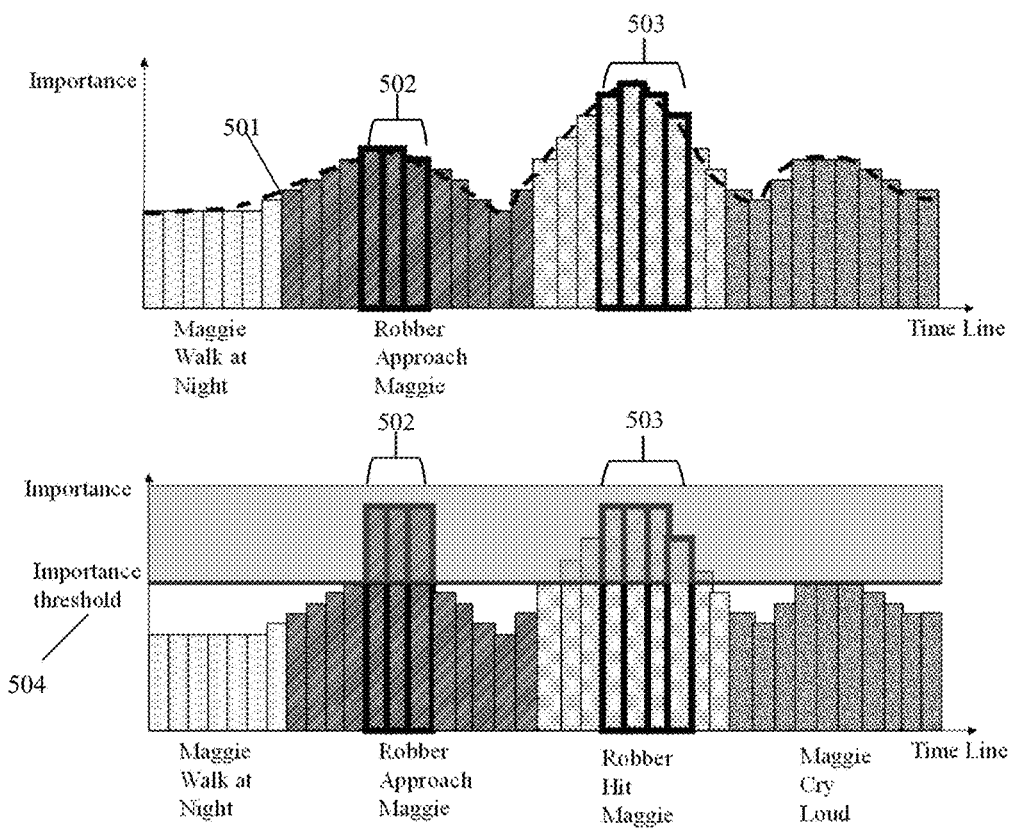
FIG. 5 illustrates a user interface for obtaining content trim related hints consistent with the disclosed embodiments.

FIG. 5 illustrates a user interface for obtaining content trim related hints consistent with the disclosed embodiments. The user interface allows user input by both draggable curve and action annotations. The upper and lower diagrams of FIG. 5 both show a user interface that displays importance trends of same sequences of actions. Specifically, a series of actions may be listed along the timeline (x-axis) and represented by one or more columns (e.g., each column may represent a unit-length-video). The height of each column (y-axis) represents its corresponding importance level. For example, four actions are listed in the diagrams shown in FIG. 5: "Maggie Walk at night," "Robber Approach Maggie," "Robber Hit Maggie," "Maggie Cry Loud." The action of "Maggie walk at night" is depicted by the first 7 columns in the diagrams. The outline formed by the upper edges of the columns, e.g., dashed curve 501 in the upper diagram of FIG. 5, is adjustable by the user to assign importance trends to related scenes/actions. For example, the user may be allowed to drag any point on the outline curve upwards or downwards to elevate or decrease the corresponding importance level. In some cases, dragging one column may result in corresponding height adjustment in columns in a same event group, or adjustment in neighboring columns (e.g., two columns to the left and two columns to the right). The amplitude of the adjustment of one column may be proportional to a distance between the one column and the column being operated (e.g., vertically dragged) by the user. The lower diagram illustrates an importance threshold 504 being applied to trim the content, i.e., eliminating scenes having an importance level lower than the threshold and keeping those whose importance level is equal to or higher than the threshold. The user interface also provides correlation adjustment function by allowing a user to specify correlation of actions that are under the same event group. For example, the user may activate a same-event function, and click/select columns or action names to identify their correlation. As shown in the upper diagram of FIG. 5, six columns (with thicker borderlines) originated from two actions, i.e., three columns 502 in the "Robber Approach Maggie" action and three columns 503 in the "Robber Hit Maggie" action, are highly correlated thus grouped as the same event. As shown in the lower diagram of FIG. 5, importance levels of columns 502 are elevated comparing to the upper diagram, and are higher than the threshold after correlation adjustment. Without correlation adjustment, a robber from nowhere suddenly hit Maggie may cause viewers' incongruity, and after adjustment, a scene describing the robber approaching are included in the video content to clear this confusion.

Clues: Clues represent essential items or characters that reveal the context of a story or indicating the outcome of events to avoid unreasonable surprises. For example, a hero goes to a castle on horseback requires a visualization of a horse before such event. But the existence of a horse, as a stage property, may not be covered in the action list (e.g., obtained from script breakdown). Failing to indicate so may result in viewers confusion. In the disclosed system, users can add clues using annotations in actions list. In this way, at the optimization stage, the system can force the algorithm to include one or more previous shots representing the clues directly or indirectly.

Vibe Related Hints: vibe related hints may include at least one of viewer perceived intensity, blink intervals, character emotion intensity, subjective POV, or character conflict intensity.

Viewer Perceived Intensity: in auto cinematography, editing rhythm may refer to the frequency of changing shots. When addressing the relationship between movie intensity and editing rhythm, the viewer perceived intensity may be considered as being proportional to the cutting frequency (e.g., frequency of changing shots). The disclosed system may request user input on the minimum shot length and the maximum shot length for the entire animation (e.g., outcome video), and request user input on the expected viewer perceived intensity curve (e.g., by providing a draggable interface for users to customize). The disclosed system may be configured to normalize the intensity curve by mapping the maximum intensity to the minimum shot length and mapping the minimum intensity to the maximum shot length. After normalization, an ideal shot length for each time unit may be obtained from the normalized curve. A shot length having lower than or higher than this ideal duration may get penalties during optimization.

"Blink" Intervals: generally, character's blink moments are not cut because the time intervals between blinks shows a continuous piece of character's thoughts and a blink moment indicates the thought change. The disclosed system may request user annotation on "Blink" interval by labelling continuous shot fragment that should not be corrupted by discontinuous shots.

Character Emotion Intensity: generally, there is relevance between a character's emotion and shot size. A shot with smaller shot size can protrude a character's facial expressions. By annotating emotional actions and character's emotional intensity helps the cameras to capture features of emotional moments.

Subjective POV (Point of View): Creating character POV is a crucial part in building character personality and identification. Generally, this technique is not used on insignificant roles in movie. A proper POV effect helps viewers to generate anticipation and involvement, and build empathy for a main character. The disclosed system allows a user to directly annotate POV shot in action list, or provide the freedom for a user to activate POV camera functions. The disclosed system may be configured to add a POV camera under reasonable circumstances to enhance immersive experience of the viewers.

Character Conflicts Intensity: Narrative conflict between characters can be enhanced by using different shooting perspectives. A flat multi-character shot usually is less expressive in representing conflicts between characters compared to shooting each character separately. By controlling people's conflict curve, the disclosed system allows a user to impact the shooting behavior (camera configuration) to escalate the conflict between characters.

Directorial Style Related Hints: Directorial style related hints may include at least one of establish shot vibe, bad guy intensity, character fear intensity, and handheld intensity.

Vibe of Establish Shot: An establish shot is the shot often appear at the start of a video or the beginning of a new scene, to expose the environment and location of that scene. The establish shot for a scene can also settle the vibe for that scene. The establish shot may be a flat long shot to convey the environment and background information of the following story. Alternatively, the establish shot may be a fast moving over head drone shot to create an epic scene vibe. The disclosed system allows a user to choose the expecting vibe and whether to add establish shot before optimization.

Bad Guy Intensity: Some shots may create special effects when shooting a "bad" character. For example, shooting a character from a lower angle can enhance the power of the character, or a close facial shot can cause natural distortion on the face which further emphasizes the despicableness of a bad role. The disclosed system allows a user to identify villain(s) in director's tool set and adjust the intensity, i.e., badness, of the villain to achieve a desired effect.

Character Fear Intensity: In order to make a character look fear and hopeless in the movie, cinematographers often emphasize the isolation of the character from surrounding objects. Shooting from a higher angle also gives viewers the impression of a character being powerless. The dominance of surrounding object(s) and a sharp comparison between the size of the object and the size of the character, producing incongruity of the scene, can also emphasize the emotion state of the character. The character fear intensity may be adjusted through a draggable curve.

Handheld Intensity: Hand-held camera or hand-held shooting is a film making and video production technique in which a camera is held in an operator's hand that often result in shaky effect. Shaky effect suggests unprepared, unrehearsed filming of reality, and can provide a sense of dynamics, immersion, instability or nervousness. By offering handheld intensity through draggable curve, the disclosed system allows a user to add the shaky effect into video.

User Add Free Cameras: When adjusting indirect hints are not effective, finer-grained adjustment can be made by freely adding camera(s) in 3D animations, and specify the start time and duration of using these cameras. In 3D environment, users can drag a camera into a scene and adjust 7-dof (degree of freedom) parameters, draw planned trajectories to mimic special shooting devices like dollies, cranes or drones. The disclosed system include a hint translator configured to generate the features from these user added cameras and embed scenes produced by these cameras into next round of optimization. In such a way the movie generated from the disclosed system can achieve users' highest satisfactions.

The framework 400 shown in FIG. 4 further illustrates how the directorial hints are utilized at different stages of movie making. The disclosed framework 400 include two major blocks: hint translation block 400-1 and optimization block 400-2. The disclosed system includes hint translators configured to implement functions in the hint translation block, including getting the protagonist 404 and distribute camera configurations based on magical space 406, automatic trimming pre-shooting content 412, clues translation 414, directorial hints stylization and emotion related hint translation 416, user added cameras interface 422 and optimization data preparation 424. Users can repetitively make adjustment to the output of the automatic camera sequence after previewing 420 the camera sequence of the optimization algorithm. Users can change the arrangement of the camera sequence in different time periods indirectly through the intuitive hint translators, or they can add user defined free cameras in the 3D animation environment. The optimization block 400-2 includes default camera placements 408, hint-based optimizer 418 and through-lens detection (not shown).

In operation, based on the framework 400, the disclosed process 300 may further include determining camera configurations in a 3D environment according to the directorial hints (S304) and establishing a camera search space that includes multiple candidate cameras to be used at different timestamps to shoot one or more scenes of the movie based on the camera configurations (S306).

Specifically, before placing a camera in a 3D environment to shoot scenes of the movie, step S304 may include determining a default camera placement 408 based on directorial hints. The directorial hints may include protagonist 404 identified based on user input, a character identified by the user that needs POV effect, and/or magical space 406 obtained from analyzing existing movie data. Positioning a camera in a 3D space to shoot frames that meets 2D constrains is a 7 degree of freedom problem. The seven degrees include camera position in the 3D space, camera orientation along 3 axes, and focal length of the camera. 2D constrains refer to movie constrains. Camera configuration may be determined by solving an optimization problem: optimizing in 7 continuous dimensions by searching for a camera composition solution that meets the movie's 2D constrains for a frame. In a practical application, the optimization of the seven dimensions may require intensive computing and may not have a viable solution. The typical frame rate for movie video is from 24 frames per second to 60 frames per second which leads to intensive computation. In order to narrow down the scope of the search space and avoid a large number of meaningless calculation, a shot analysis tool is employed to perform a detailed shot analysis on highly-acclaimed films/videos (e.g., 10 of the most popular TV series according to IMDB popularity ranking).

Figure 7:
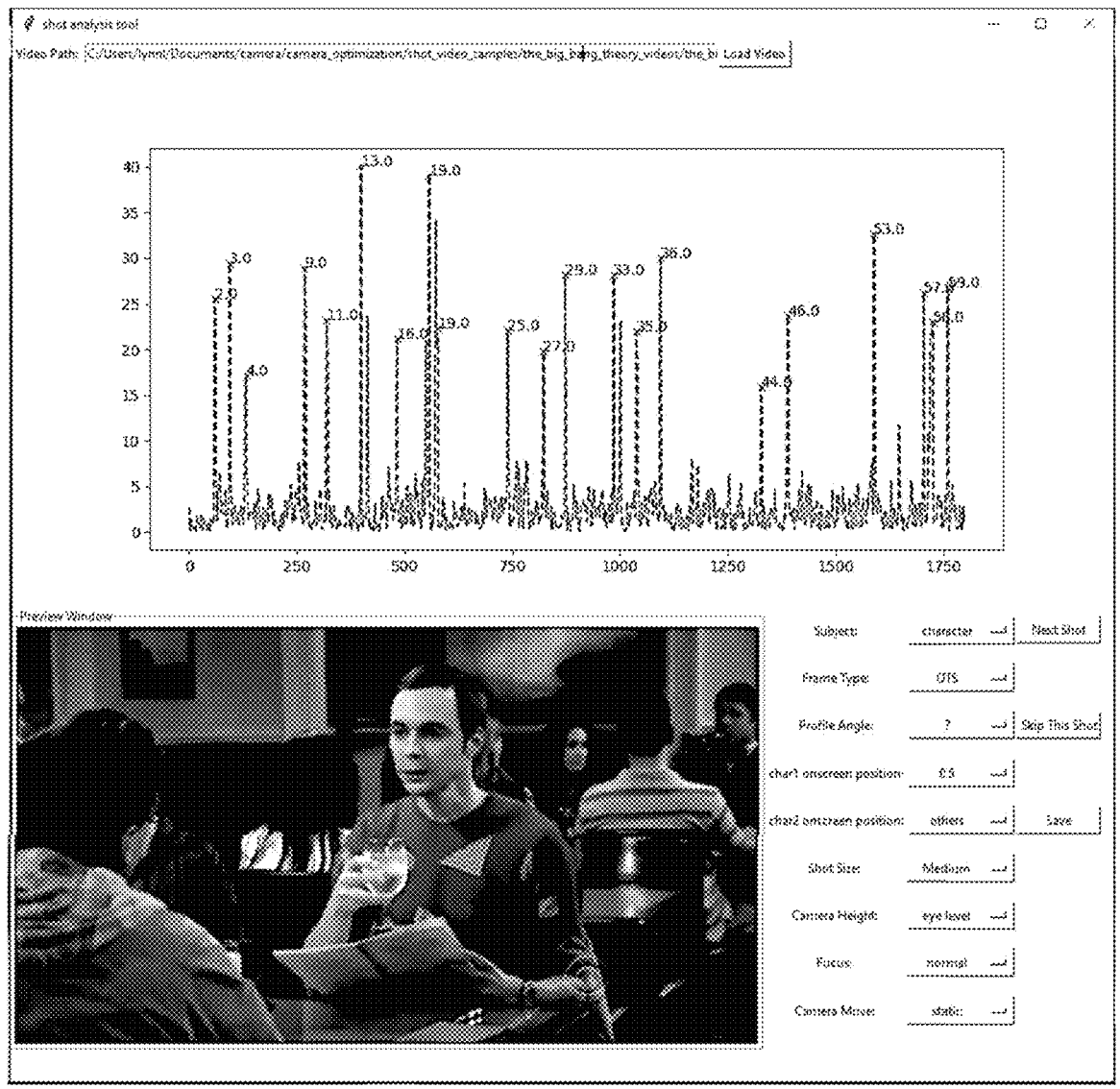
FIG. 7 illustrates an exemplary shot analysis tool consistent with the disclosed embodiments.

FIG. 7 illustrates an exemplary shot analysis tool consistent with the disclosed embodiments. As shown in FIG. 7, important shot features in cinematography field, such as shot size, camera height, camera profile angle, frame type, camera focus, camera movement, and character onscreen position for each shot are recorded by the shot analysis tool in each video. Shot transition detection is done by adaptive threshold on frame change gradients. After identifying shots in the video by shot transition detection, a preview window of the shot may be displayed. Each shot is described by a sequence of shot features. The shot features may be manually entered by film expertise on the user interface of the shot analysis tool.

Figure 6A:
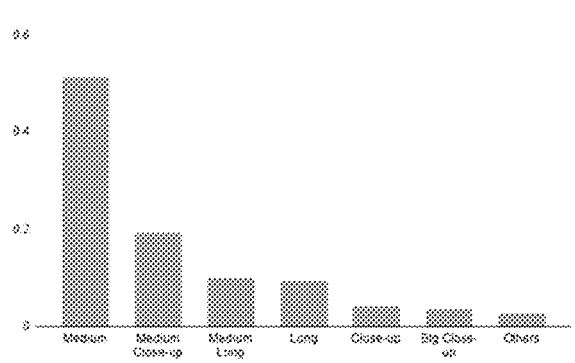
FIG. 6A is a diagram of shot size distribution obtained from shot analysis consistent with the disclosed embodiments.
Figure 6B:
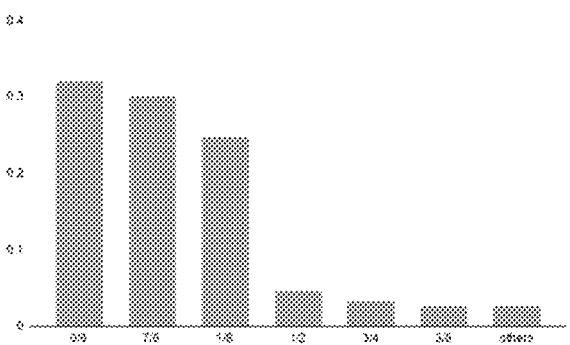
FIG. 6B is a diagram illustrating distribution of profile angles obtained from shot analysis consistent with the disclosed embodiments.

After analyzing the highly-acclaimed videos by using the shot analysis tool, it is discovered that shot distribution in movie making has a long-tail effect: a group of most commonly used camera configurations covers over 80% of the shots in a film. FIG. 6A-6B are diagrams showing camera configuration distribution results obtained from the shot analysis tool. Specifically, FIG. 6A is a diagram of shot size distribution. As shown in FIG. 6A, most shot sizes used in movies are medium shots, medium close-up shots, and medium long shots, long shots, close-up shots, and big close-up shots. FIG. 6B is a diagram illustrating distribution of profile angles. As shown in FIG. 6B, most profile angles in movies are at 0/8, 7/8, 1/8, 1/2, 3/4, and 3/8 positions. Based on this observation, the 7-dof infinite search space can be narrowed down to countable discrete camera configurations. The most commonly used shot configurations group are named as the "Magical Space" for movie making.

The process of placing a camera in the 3D space may further be divided into two categories, single-person/single-item camera placement and two-character camera placement. Shots with more than two characters in view often include a main character and thus can be considered as the main character's single-person shot.

Figure 8A:
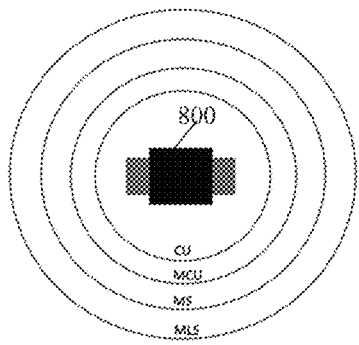
FIGS. 8A, 8B, and 8C illustrate possible configurations of a single person camera related to shot features consistent with the disclosed embodiments.
Figure 8B:
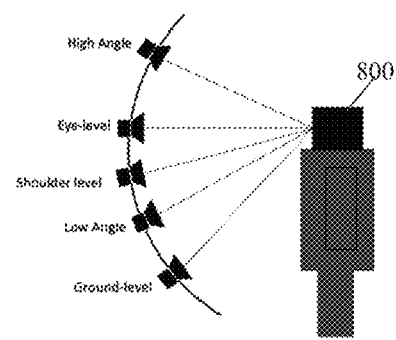
Figure 8C:
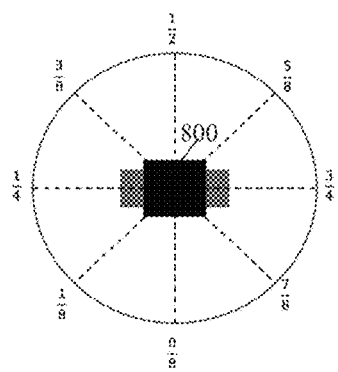

For a single-person camera, a default tracking function provided by a 3D animation engine can be utilized to guide the movement of the camera as the character/item moves while maintaining the relative position between the camera and character. In these cases, the knowledge of exact position of the character/item may not be needed during the animation since the relative position between the camera and the character is maintained. Different shot size, height, profile angles used by a single person camera are illustrated in FIG. 8A, FIG. 8B, and FIG. 8C, respectively. FIG. 8A illustrates that a camera 800 can be framed to produce different shot sizes, such as Close-up (CU), Medium Close-up (MCU), Medium Shot (MS), and Medium Long Shot (MLS). FIG. 8B illustrates different camera heights that may be used to shoot a person, including: high angle, eye-level, shoulder level, low angle, and ground level. FIG. 8C illustrates 8 different profile angles (0-8) at 45 degree intervals. In some embodiments, a single-person camera is by default placed in the 3D environment according to the magical space (i.e., predefined most common camera configurations). For example, a scene may be shot by a camera using the four shot sizes as shown in FIG. 8A and the 5 camera heights shown in FIG. 8B to produce candidate videos based on their combinations. The corresponding camera search space has 4*5=20 candidates. Similarly, other types of camera configurations can be added when building the camera search space. Camera configurations belonging to the Magical Space and satisfying certain constrains based on director hints can make up the initial camera search space.

Figure 9:
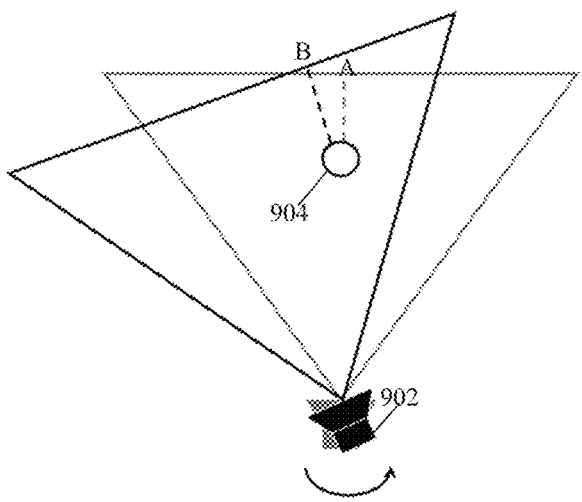
FIG. 9 is a schematic diagram illustrating camera rotation causing change on screen position consistent with the disclosed embodiments.

Further, translating 2D on-screen position for a single-person camera can be done by rotating cameras when the shot size and profile angle are determined. Adjusting camera orientation is also consistent with cinematography process for modifying on-screen positions of characters. FIG. 9 shows a rotated camera 902 to change projected position of a character 904 from position A to position B on 2D frame. Regarding focal length of the camera, shallow focus can be done by utilizing focus script in an existing 3D engine. The focus setting for each single-character or single-item camera can either be focusing on the corresponding character/item, or no focus setup which represents static or deep focus in 3D animations.

In some embodiments, two-character camera can only be triggered when absolute distance between two characters is in a defined range. A default two-character camera may also perform as a tracking camera along the entire animation.

In some embodiments, before editing optimization, initial candidate camera sequences may be generated using the default camera placement scheme as described above.

Further, when producing a scene that has a user defined protagonist 404 in it, all camera configuration settings from magical space 406 are assigned to a single-person tracking camera or two-character camera to shoot the scene involving protagonist. By doing so the camera diversity related to protagonist character is enriched and the camera complexity for insignificant characters is suppressed. This differential treatment reduces the probability of viewer's confusion on protagonist and accelerate the optimization since the camera search space is smaller compared to evenly adding cameras on all characters.

When the camera search space is established, the disclosed system may perform hint-based editing optimization (S308). The editing optimization 418 can be formalized into a process of finding a path with minimum cost in a graph model, each path in the graph model describing a candidate camera sequence for producing the movie, and at least some of the directorial hints are translated into cost functions of the graph model.

In some embodiments, the atomic time unit for editing optimization may be ½ second. Using finer grand time split can increase optimization precision, but ½ second is often enough for most of the narrative storytelling. This time unit is inherited from slicing actions at content trim step.

Figure 10:
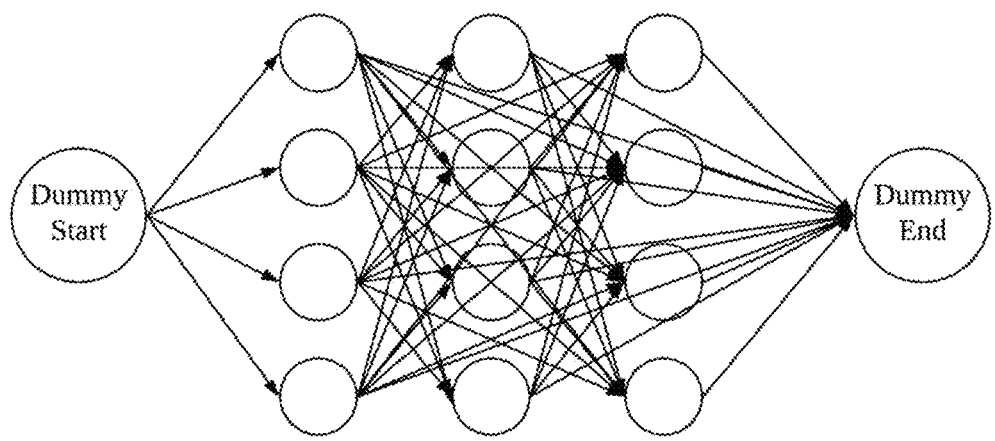
FIG. 10 illustrates a schematic diagram for a graph model consistent with the disclosed embodiments.

Editing optimization includes finding proper camera placement in different scenes, (e.g., specifying shot features, orientation, and focal length of a camera for each time unit of the movie). In some embodiments, the editing optimization can be formalized into a slightly modified graph problem of finding the minimum cost path in a graph. FIG. 10 illustrates a schematic diagram for a graph model consistent with the disclosed embodiments. In the graph model, $t_i$ represents the ith time unit of the total animation. $c_u$ represents the uth default camera from camera search space, and $c_k^*$ represents the kth free cameras added by users. $[t_i, c_u]$ means using default camera $c_u$ to shoot for time $t_i$ and $[t_i, c_k^*]$ means using a user specified camera $c_k^*$ to shoot for time $t_i$. These time/camera tuples are the Nodes in the graph model (e.g., shown as blank circles in FIG. 10). In FIG. 10, nodes in the same column represent different cameras used at the same time. A path should go through only one node in each column, meaning only one camera is selected to shoot the scene at one time point. Nodes in the same row may represent the same camera used at different time units. The patch can only go from left to right, meaning movie time should progress chronologically and not backwards. A transition from $[t_i, c_u]$ to $[t_j, c_v]$ means from time $t_i$ to $t_j$, using camera $c_u$ for shooting, and a camera switch from $c_u$ to $c_v$ occurs at time $t_j$. These transitions are represented as Edges. Switching from node $[t_i, c_u]$ to node $[t_j, c_v]$ induces a time jump from $t_i$ to $t_j$, this jump is defined as Hops.

A path in the graph model represents an editing strategy. The paths has a constrain on time index to ensure time increase monotonically for the node sequence. That is, the path can only go one direction from start to end. A switch from one camera to another camera (e.g., transition from node $[t_i, c_u]$ to node $[t_j, c_v]$) may occur in a path. Alternatively, a same camera is used for two time units (e.g., transition from node $[t_i, c_u]$ to node $[t_j, c_u]$). A dummy start node with no cost is added to the graph model to ensure that different nodes with minimum time index are all considered in finding the minimum cost path. The dummy start node only has out order edges to the nodes with minimum time index. Similarly, a dummy end node is added with no cost and only have in order edges from other nodes.

The cost of a path from start node to end node consists 3 categories: node cost $L^N$, edge cost $L^E$ and hop cost $L^H$. $L^N(t_i, c_u)$ represents the cost function related to using camera $c_u$ at time $t_i$. $L^E(t_i, t_j, c_u, c_v)$ represents the cost function related to switching camera from $c_u$ to $c_v$ at time $t_j$. $L^H(t_i, t_j)$ represents the number of hops skipped by switching from time unit $t_i$ to time $t_j$. Different directorial hints can be translated into different categories of cost functions. In some embodiments, $L^N$ may be a weighted sum of all node cost functions translated from directorial hints. Similarly, edge cost $L^E$ may be a weighted sum of all edge cost functions and hop cost $L^H$ may be a weighted sum of all hop cost functions. With the help of the slightly modified graph representation, the objective functions can be minimized using Dijkstra's algorithm for finding the minimum cost path from dummy start node to dummy end node. The total cost function can be defined as a recursion function as Equation 1.

$$L(t_i,c_u)=\{L(t_j,c_v)+L^E(t_i,t_j,c_u,c_v)+\Sigma_{t_j \leq t' < t_j}L^N(t',c_u)+L^H(t_i,t_j)\} \quad (1)$$

Dynamic programming may be employed for solving the minimum cost of each intermediate [time, camera] node. The path with minimum cost $L(-1, c_{start})$ from dummy start node to dummy end node is the camera sequence output. The output node sequence, i.e., camera sequence, is a sequence of <camera index>, <start time>, <duration>. Here, <camera index> is the index of camera from camera search space including default cameras and user added cameras, <start time> represents the start time of using this camera, <duration> represents the time duration of continuously using this camera.

In some embodiments, <tracking> feature can be included for camera configuration. Specifically, once the camera sequence is established, there are two options of camera behavior properties, and <tracking> feature indicates whether this camera retains its tracking behavior or works as a static camera. Working as a static camera means having a static copy of this camera's configuration at <start time> and use this copy to shoot for <duration> of time. The camera in tracking mode means the camera tracks a character movement and moves together with the character during that <duration> of time.

The <tracking> feature can be used for obstacle avoidance. Specifically, in the disclosed system, camera configuration optimization and 3D animation environment are relatively separated. The advantage of this separation is that the camera optimization framework can be optimized without too much pre-knowledge of the 3D animation, and the modification of the 3D scene does not significantly affect the camera optimization results. However, limited 3D environment knowledge might cause collision between cameras and obstacles. When the output camera sequence is determined, the default camera behavior is to leave a static copy of this camera for that time duration, but the camera can activate tracking mode if needed. Tracking mode can be used to avoid through-lens effect of moving characters with static cameras (e.g., the character/item moving to passing through the lens of the camera, causing lost of the character in the scene shot by the camera). By changing static mode to tracking mode the camera maintains a relative position with its target character to avoid collision. In the disclosed system, the probability of having the cameras to go through static obstacles is low because the optimization utilize frame quality cost where occluded visibility raises cost in cost functions. The tracking mode is particularly useful when the target character/item is moving at a high speed and adding the static copy of the tracking camera might cause a through-lens effect.

In some embodiments, conflict detection is added for each element in camera sequence. First assume each camera is a static copy for camera sequence element [<start time>, <duration>, <camera index>], if projected velocity of a moving object on the normal vector between the current camera and the moving object is high enough for the object to reach that static camera (e.g., moving across the initial distance from the object to the camera) within the <duration>, it is assumed that there is a high probability of though-lens effect. If so, this camera element is switched from static mode to tracking mode.

Through various user's translated hints input, the optimizer 418 can generate an optimal sequence of camera configurations while monitor possible through-lens conflicts and adjust camera movements.

Some directorial hints obtained in Step S302 can be represented/translated mathematically and fused into the graph model as cost functions. Some of the directorial hints can be used as other constrains of the graph model. Some directorial hints can directly influence the output camera sequence. Some directorial hints are obtained as intermediate preview videos are generated when the user would like to make adjustments to an intermediate video. Table 2 lists variables related to director hints.

TABLE 2

Director Hint Variables

| Variable | Explanation |
|---|---|
| $t_i$ | ith time unit |
| $t_{start}$ | animation start time |
| $t_{end}$ | animation end time |

TABLE 2-continued

Director Hint Variables

| Variable | Explanation |
|---|---|
| $t_{expected}$ | user expected video duration |
| $c_u$ | uth camera |
| $[t_i, c_u]$ | graph node representing use $c_u$ for $t_i$ |
| $[t_i, t_j, c_u, c_v]$ | graph edge, use $c_u$ to shoot from $t_i$ to $t_j$, camera switch at $t_i$ from $c_u$ to $c_v$ |
| $L^N(t, c)$ | node cost for [t, c] |
| $L^E(t_i, t_j, c_u, c_v)$ | edge cost from $[t_i, c_u]$ to $[t_j, c_v]$ |
| $L^H(t_i, t_j)$ | hop cost from $t_i$ to $t_j$ |
| I(t) | user defined intensity at time t |
| E(t) | user annotate event at time t. An event is collections of highly correlated actions. |
| $I_{threshold}$ | intensity threshold for trimming content into user expected video duration. |
| clue | user defined clue object, consists clue object and clue annotated time in action list. |
| CLUE(t) | user defined clues after time t |
| FRAMESIZE | frame width * frame height after rendering |
| O(clue) | clue object |
| V(t, c, O(clue)) | 2D on screen Visibility of clue after for camera c at time t |
| $L_{CL}^N(t, c)$ | one node cost, clue cost |
| Int(t) | user defined intensity at time t |
| f(t) | calculated expected shot switch frequency at time t |
| d(t) | calculated expected duration at time t |
| $Int_{max}$ | maximum intensity from intensity curve |
| $d_{min}$ | user defined minimum allowed shot duration |
| $f_{max}$ | user defined max allowed shot switch frequency |
| $L_I^H(t_i, t_j)$ | one hop cost, intensity cost |
| b | a "blink" interval, user defined "no switch" time interval |
| B | user defined "Blink" intervals |
| T(b) | start time of b |
| D(b) | duration of b |
| $L_B^E(t_i, t_j)$ | one edge cost, "blink" cost |
| $V_{face}(t, c, char)$ | 2D onscreen face visibility for character char on camera c at time t |
| IntE(t, char) | emotion Intensity for character char at time t |
| $IntE_{max}(char)$ | maximum emotion intensity for char char |
| $L_E^N(t, c)$ | one node cost, emotion intensity cost |
| g | a group of characters on same side in terms of conflicts |
| G | set of all groups |
| NG(t, c) | number of visible groups on camera c at time t |
| $L_C^N(t, c)$ | one node cost, conflict cost |
| IntC(t) | user defined conflict intensity between groups at time t |
| Dist2D(t, c, char, i) | 2D onscreen distance from character |
| $Dist2D_{max}$ | maximum on screen distance which is diagonal length for frame |
| Objs(t, c, char) | visible onscreen characters or items other than character char for camera c at time t |
| Iso(t, c, char) | isolation factor of character char for camera c at time t |
| ObjCont(t, c, char) | object contrast for camera c at time t |
| $L_F^N(t, c)$ | one node cost, character fear cost |

After the first rendering is completed, the animation timeline can be obtained. In addition, start time and time duration for each single action and/or parallel actions (actions happen in the same time periods) can be obtained. Some actions may have relatively long durations, such as eating, writing, and moving from one location to another. In order to map user input (e.g., a continuous importance curve shown in FIG. 5) to actions and help users to present delicate importance within one action, the actions can be further divided into units (e.g., time units). That is, a continuous action including multiple units can have different importance levels corresponding to each of the multiple units. The continuous action may get partially included in the trimmed content. Let I represent the user input on the importance curve input, then I(t) is the user defined importance at time t.

Actions annotated as closely correlated (from same event group) can have the same importance, e.g., the highest importance within the event group. Let E (t) represents the event group for action at time t, then the correlation adjustment can be represented as the following equation $$I(t)=\max\{I(t'):E(t')=E(t)\} \quad (2)$$

In some embodiments, a trimmed action list may be obtained after the user adjusts the importance curve. A content preview may then be presented to the user on a user interface (4122). The user may view the trimmed content and mark correlated events to adjust its importance level (4124). The user interface allows the user to trim the action list and adjust importance level as much as he/she desires until a satisfying result is achieved.

Further, $t_{start}$ and $t_{end}$ represent the start time and end time of the animation, and based on user provided expected total time $t_{expected}$, a binary search can be conducted to automatically adjust the importance threshold and drop/remove actions with importance less than a threshold until an animation with a total time closest to user's expectations is obtained. The following equation defines the threshold search $$I_{threshold}=\min\{I(t):t_{start}\le t\le t_{end}\}$$

$$s.t. \ \Sigma_{t_{start}\le t\le t_{end}}\{t':I(t')>I_{threshold}\}\le t_{expected} \quad (3)$$

By using the director's importance curve and action correlation annotations, the shooting content of the movie can be automatically edited (i.e., time-adaptive pre-shoot content trim) before camera optimization 418, thus the user do not need to consider incompatibility of the animation duration and movie duration. The data for editing optimization are also vastly decreased due to the less shooting actions left.

In some embodiments, user's clue hints 414 used in optimization can be translated into mathematical representations. A clue is a constrain to encourage the visualization of an important object before the occurrence of an action. A clue is an object annotated by users in action list. Provided that O(clue) represents a clue object, T(clue) represents the time of that clue object in the action list. CLUE(t) is defined to represent a set of clues after time t.

$$CLUE(t)=\{clue: T(clue)>t\} \quad (4)$$

Clue hints can be used as a constrain in the graph model for editing optimization. $L_{CL}^{N}(t, c)$ represents the node cost related to clue hints. V(t, c, O(clue)) stands for the visibility of clue object for camera c at time t, FRAMESIZE is frame area after rendering.

$$L_{CL}^N(t, c) = \begin{cases} 0, & \text{if } CLUE(t) = \emptyset \\ \sum_{clue \in CLUE(t)} \frac{V(t, c, O(clue))}{FRAMESIZE}, & \text{otherwise} \end{cases} \quad (5)$$

This cost function vastly encourage the visualization for clue objects for time/camera nodes before clue start time.

Vibe related hints can also be translated and added to the editing optimization process. For example, for a director hint related to viewer perceived intensity, let Int(t) represents the user expected intensity at time t, it can be directly drawn from intensity curve, or from interpolation by user offered intensity values. The viewer's perceived intensity may be positively correlated to shot switch frequency. In mathematical representation, d(t) refers to the expected duration at time t, the desired frequency is $$f(t) = \frac{1}{d(t)}.$$

The maximum intensity may be represented by: $Int_{max}=\max\{Int(t): t_{start}\le t\le t_{end}\}$, and the minimum intensity may be $Int_{min}=\min\{Int(t): t_{start}\le t\le t_{end}\}$. Accordingly, with $f_{max}$ being the maximum shot switch frequency, the expected frequency at time t is $$f(t) = \frac{Int(t)}{Int_{max}} f_{max} \quad (6)$$

Since the expected duration $$d(t) = \frac{1}{f(t)},$$

the cost function related to viewer perceived intensity can be written as $$L_I^H(t_i,t_j)=\alpha|(t_i-t_j)-d(t_i)| \quad (7)$$

In some embodiments, a is a coefficient to normalize the cost to a specific range (e.g., [0, 1]), which can be used and adjusted in calculating a weighted sum of all hop cost functions. This cost function of viewer perceived intensity is a hop related cost for the graph model, which aggregate penalties for early or late shot switch.

"Blink" intervals represent a continuous piece of moment where the director wishes to avoid shot switch (changing camera during the moment). This is a common requirement for leaving audience some time to immerse in the current scenario and not to be interrupted by a sudden shot change. To embed this requirement into editing optimization, edge cost is added to the graph model for decreasing the chance of shot change among certain specified sequence of nodes (e.g., sequence of nodes related to the continuous moment/ duration identified by the user to avoid shot switch). The cost function can be written as:

$$L_B^E(t_i, t_j) = \begin{cases} 1, & \text{if } T(b) \le t_j \le (T(b)+D(b)) \text{ for } b \in B \\ 0, & \text{other} \end{cases} \quad (8)$$

In the above equation (8), b represents a continuous time interval (e.g., time period specified by the director), B is the set that includes all blink intervals, T (b) stands for start time of b and D (b) stands for duration of b. This edge cost of the blink interval director hint prevents edges to land within any annotated continuous time intervals.

Character emotion intensity may also be used in editing optimization. A closer shot can be generated to emphasize a character's face when the story is getting emotional, as the character's exposed emotion can be presented by facial expression. A node cost function related to exposing facial expressions can be established to translate high values from the user-entered emotion intensity curve. IntE (t, char) represents emotion intensity for character char at time t. $V_{face}$(t, c, char) stands for character char's facial visibility captured by camera c at time t. $IntE_{max}$ denotes maximum emotion intensity (e.g., obtained from the intensity curve based on user input). The node cost function for character emotion intensity can be written as $$L_E^N(t, c) = \sum_{char} \left| \frac{IntE(t)}{IntE_{max}} - \frac{V_{face}(t, c, char)}{FRAMESIZE} \right| \quad (9)$$

This node cost function of character emotion intensity encourages closer facial shot for intense emotional moment.

Figure 11A:
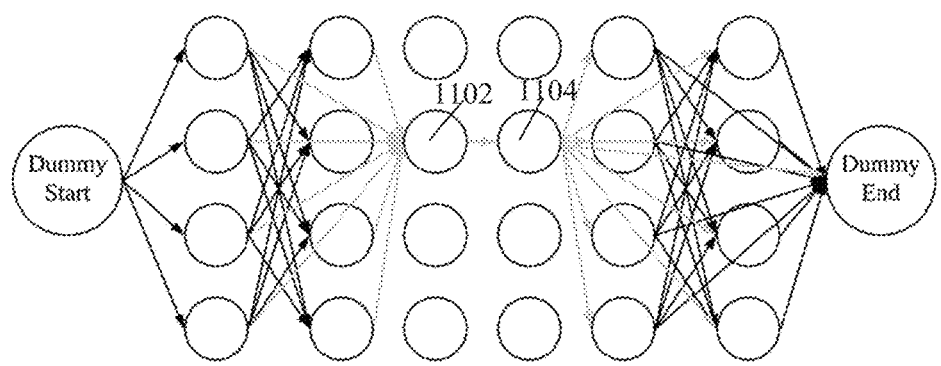
FIG. 11A illustrates a schematic diagram for a graph model being forced to go through a default camera consistent with the disclosed embodiments.

In some embodiments, POV cameras can be included in the magical space set up, where each main character has a tracking camera at eye level to mimic character's looking behaviors, i.e., to gain the sight perceived by the character. That is, a POV camera directed to a character is included in the initial camera search space as a default camera. There are moments when director wants to activate a subject point of view and let audiences feel what the main characters feel. By annotating a POV camera for certain time periods, the optimization algorithm can be set to force the cameras path (path in the graph model) to go through nodes representing the main character's POV within annotated time duration. FIG. 11A illustrates a schematic diagram for a graph model forced to go through a default camera consistent with the disclosed embodiments. As shown in FIG. 11A, nodes 1102 and 1104 represents POV camera that should be used at the corresponding section of the movie, so node 1102 is the only camera in its column to be selected.

A contrast in visibility can raise the conflicts between people, affinity/similarity in visibility like a flat two-people shot reduce the viewer perceived conflict between people. Let g represent a group of characters, G represent the set of all groups, V(t, c, char) represent 2D onscreen face visibility for character char on camera c at time t, and NG(t, c) stand for number of visible groups for camera c at time t, the size contrast for camera c at time t can be written as:

$$Cont(t, c) = \quad (10)$$
$$\begin{cases} 1, & \text{if } NG(t, c) \leq 1 \\ \sum_{g \in G} \frac{\sum_{char \in g} V(t, c, char)}{\sum_{g \in G} \sum_{char \in g} V(t, c, char)} - \frac{1}{NG(t, c)}, & \text{other} \end{cases}$$

$$\text{where } NG(t, c) = \left| \left\{ g: \sum_{char \in g} V(t, c, char) \neq 0 \right\} \right|$$

Cont(t, c) describes the contrast in size for people (e.g., 2D whole body visibility) from different groups. The highest contrast value equals to 1 when the shot only shows people from a single group. When multiple groups of people are on site (in the same scene) and visibility of the multiple groups are evenly distributed, the minimum contrast value equals to 0. This contrast in visualization size enhance the impression of conflicts between people. IntC(t, c) refers to user-defined conflict intensity between groups at time t. The node cost function for character conflict intensity can be written as $$L_C^N = \alpha \left| \frac{IntC(t, c)}{IntC_{max}} - Cont(t, c) \right| \quad (11)$$

This node cost function encourages greater visualization size that enhances the impression of conflicts between people.

Directorial style related hints 416 are also considered in editing optimization. The editing optimizer may generate an intermediate video according to a candidate camera sequence. The intermediate video may be generated by finding a camera sequence from the graph model after obtaining some director hints (e.g., the trimmed action list, the clue constrains, and vibe related hints) and using them in cost function of the graph model. The disclosed system includes a video preview interface 420 that displays the intermediate video and provides options for the user to further adjust the editing process, such as adding an established shot, adjusting certain shot size and angle of villain scenes, adding shaky effects to certain scenes, adding a user-defined camera 422, etc. The video preview interface 420 may further allow the user to adjust other director hints (e.g., the trimmed action list, the clue constrains, and vibe related hints) and displaying an updated intermediate video based on adjusted hints. This process can be repeated as many times as the user desires to reach a satisfied result.

In some embodiments, the disclosed system offers a user the chance to add an establish shot at the start of every scene. This established shot may cover background environment of that scene. Candidate establish shots having different pre-defined shot configurations are categorized, the pre-defined shot configurations corresponding to different vibes. The user can choose an establish shot from the candidate shots using the hint interface.

When a character is annotated by the user as a "bad" character, the impression of its "badness" may be enhanced by higher inclination of selecting cameras from lower angles, getting closer shot to catch evil expressions, and adding extremely close cameras to create a slightly distorted effect.

Isolation from surrounding objects can induce the fear of a character, a dominance visualization in objects also deepens audiences' feelings about characters weakness. Here, Dist2D (t, c, char) represents on screen 2D distance between a character and all other objects in view. Let O(t, c, char) denote visible onscreen characters or items other than the character char, the isolation factor of character char for camera c at time t can be written as:

$$Iso(t, c, char) = \frac{\sum_{i \in O(t,c,char)} \frac{Dist2D(t, c, char, i)}{Dist2D_{max}}}{[O(t, c, char)]} \quad (12)$$

Further, the object contrast for camera c at time t can be written as:

$$ObjCont(t, c, char) = \frac{\sum_{i \in O(t,c,char)} (t, c, i)}{\sum_{i \in O(t,c,char)} (t, c, i) + V(t, c, char)} \quad (13)$$

Provided that IntF(t, c) denotes fear intensity produced by camera c at time t, the node cost function for character' fear can be obtained by:

$$L_F^N(t, c) = \sum_{char} \left( \left| \frac{IntF(t, c)}{IntF_{max}} - Iso(t, c, char) \right| + \left| \frac{IntF(t, c)}{IntF_{max}} - ObjCont(t, c, char) \right| \right) \quad (14)$$

This node cost function encourages shots that enhances fears of a character.

For user annotated handheld actions, the disclosed system imitates handheld shaky effect by adding random position deviations from original position within small ranges. A camera annotated by the user to show handheld effect can be moved (e.g., random position deviations) within a defined time range. The moving frequency and deviated magnitudes are proportional to a handheld intensity (e.g., selected by the user in the director-hint collection interface).

Figure 11B:
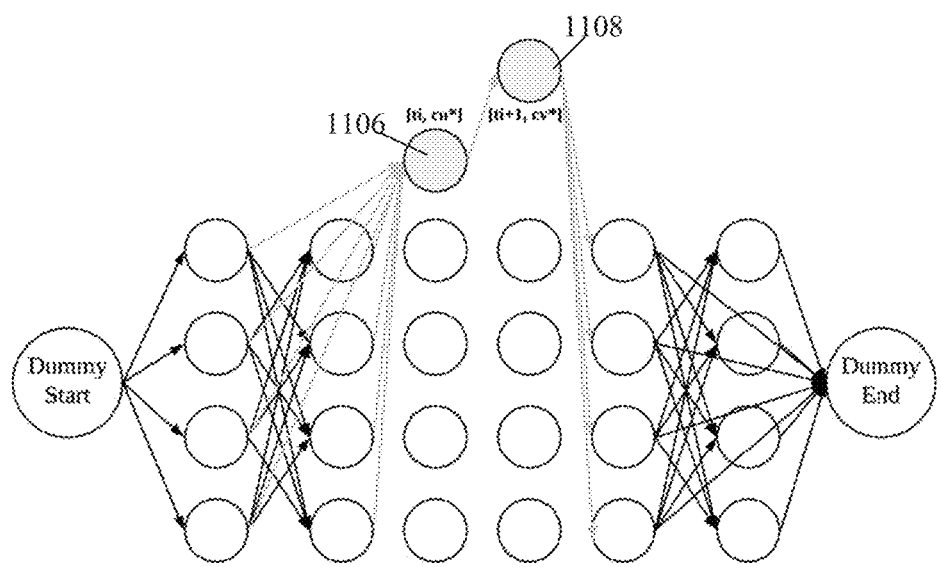
FIG. 11B illustrates a schematic diagram for a graph model being forced to go through two user added cameras consistent with the disclosed embodiments.

A user added free camera is a user defined camera in 3D environments of the animation. Such camera can have complete freedom in continuous 7-dof space, the user can, in the disclosed system, choose to add a camera at any time for any duration of time and can define camera trajectories and moving behaviors. A user added camera (e.g., defined using the user added cameras interface 422 and rendered by an optimization data preparation module 424) has highest priority in optimization. That is, the edit optimization algorithm can force the path in the graph model to go through a camera node representing the user added camera for that duration of time. But different from POV fixed cameras, user newly added cameras wouldn't have tracking behaviors like default cameras, so the path will reroute to the nearest default nodes at the end of defined time sequence. FIG. 11B illustrates a schematic diagram for a graph model being forced to go through two user added cameras consistent with the disclosed embodiments. As shown in FIG. 11B, nodes 1106 and 1108 denotes applying user added camera $c^*_u$ to shoot scenes at time $t_i$ and applying user added camera $c^*_v$ at time $t_{i+1}$.

In some embodiments, the editing optimization may further include narrative, aesthetical and 2D continuity optimization. Shot size may be adjusted in the optimization process based on Hitchcock's theory, namely, "the size of an object in the frame should equal its importance in the story at that moment." In some embodiments, aesthetical costs according to look room and headroom in frame can also be added as weighted factors in the optimization process. Continuity costs may also be added to avoid discontinuity feelings on 2D frames.

Once the user is satisfied with the video in the preview interface 420, the disclosed system can output the edited video as the 3D animated movie (S428).

The disclosed framework 400 can perform director hinted based optimization that support various user inputs. The framework considers six possible types of director hints, namely protagonist, content trim related, clues, directorial stylization related, vibe-related and user added free cameras. These six types of inputs can greatly improve the quality of the output video, making videos more attractive and logically correct. For example users can easily control the tension of the generated video at different times through the intensity curves (e.g., by dragging certain portion of a curve in a graphical user interface). Further, the rhythm is no longer the same throughout the movie, and the quality of a movie is greatly increased by this diversity. Another example is that the disclosed framework can emphasize on film clues. To the inventors' best knowledge, there is no existence of an algorithm that can consider the importance and rationality of movie clues as the disclosed framework. When an item is involved in the story, it should not be a sudden appearance without background information being introduced. Such a fright will cause the film segment to be unreasonable and leave the viewer a sense of discontinuity. The disclosed framework, when performing hint based optimization, integrates the order of appearance for user specified clues and thus can avoid such unpleasant surprises for viewers.

Further, the disclosed framework for auto-cinematography optimization can iteratively absorb user's subjective goals and offer timely feedback for user's adjustments until satisfying results are achieved. Users can cooperate with the cinematography process through hint translation blocks. With the benefit of the hint translator, the multi-loop feedback mechanism and director hint-based optimizer provided by the disclosed framework, users get the ability to deeply embed subjective ideas into movie making.

Compared to existing auto-cinematography algorithms, the output video of the disclosed system has diverse directorial styles, the vibe inputs make film viewers more immersed into the movie, the video content is more in line with the director's expectations, and the optimization time is greatly reduced.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method of generating video in three-dimensional animation environment, comprising:

obtaining and translating directorial hints for making a 3D animated movie based on user input;

determining camera configurations in a 3D environment according to the directorial hints;

establishing a camera search space that includes multiple candidate cameras to be used at different timestamps to shoot one or more scenes of the movie based on the camera configurations;

performing editing optimization based on the camera search space and the directorial hints, to obtain an edited video, wherein the editing optimization is formalized into a process of finding a path with minimum cost in a graph model, each path in the graph model describing a candidate camera sequence for producing the movie, and at least some of the directorial hints are translated into cost functions of the graph model; and output the edited video as the produced 3D animated movie, wherein:

a node $[t_i, c_u]$ in the graph model represents using a camera $c_u$ to shoot for time $t_i$;

an edge transitioning from $[t_i, c_u]$ to $[t_j, c_v]$ in the graph model represents from time $t_i$ to $t_j$, using camera $c_u$ for shooting, and a camera switch from $c_u$ to $c_v$ occurs at time $t_j$;

a hop $(t_i, t_j)$ represents a time jump from $t_i$ to $t_j$ in the graph model;

the cost functions of the graph model includes: a node cost $L^N(t_i, c_u)$ representing a cost of using camera $c_u$ at time $t_i$, an edge cost $L^E(t_i, t_j, c_u, c_v)$ representing a cost of switching camera from $c_u$ to $c_v$ at time $t_j$, and a hop cost $L^H(t_i, t_j)$ representing a number of hops skipped by switching from time unit $t_i$ to time $t_j$, and a total cost function of the graph model is $$L(t_i, c_u) = \{L(t_j, c_v) + L^E(t_i, t_j, c_u, c_v) + \Sigma_{t_i = t' < t_j} L^N(t', c_y) + L^H(t_i, t_j)\}.$$

2. The method according to claim 1, wherein obtaining the directorial hints comprises:
providing graphical interface tools to obtain the directorial hints, wherein types of the graphical interface tools include: a draggable curve interface, an action annotation interface, and a multiple choices interface.

3. The method according to claim 1, wherein the draggable curve interface is configured to obtain intensity related parameters, and the method further comprises:
obtaining a dragging operation on a point in an intensity curve displayed in the draggable curve interface;
adjusting an intensity trend surrounding the point based on the dragging operation; and
obtaining intensity parameters based on the adjusted intensity curve.

4. The method according to claim 3, wherein the intensity curve represents importance trend of events in the movie, each point on the intensity curve representing user defined importance of an event at a corresponding time period; and the method further comprises:
obtaining user annotations on an event group, the event group including multiple correlated events; and
adjusting importance levels of the correlated events to be equal to the highest importance of an event within the event group.

5. The method according to claim 1, wherein types of the directorial hints include at least two of protagonist hint, content trim related hints, clue hint, vibe related hint, directorial style related hint, or user add free camera.

6. The method according to claim 1, wherein:
the directorial hints includes a protagonist identified by the user in a scene; and
determining the camera configurations comprises: placing a camera to track the protagonist in the scene.

7. The method according to claim 1, wherein:
the directorial hints includes camera configuration groups learnt from previously made movies; and
determining the camera configurations comprises: placing multiple cameras in the 3D environment, each camera having settings from one of the camera configuration groups.

8. The method according to claim 1, further comprising:
generating an intermediate video from the editing optimization;
displaying the intermediate video in a video preview user interface;
obtaining adjusted directorial hints from the video preview user interface;
updating the graph model based on the adjusted directorial hints;
obtaining an updated camera sequence representing the minimum cost path in the updated graph model; and
displaying an updated video based on the updated camera sequence in the video preview user interface.

9. The method according to claim 8, wherein:
the adjusted directorial hints includes a camera added by the user to shoot for a specified time; and
obtaining an updated camera sequence representing the minimum cost path in the updated graph model comprises: forcing candidate paths of the graph model to go through a node representing the user added camera.

10. The method according to claim 1, wherein the node cost includes at least one of:
a first node cost function $L_{CL}^N(t, c)$ related to clue hints on camera c and represented by:

$$L_{CL}^N(t, c) = \begin{cases} 0, & \text{if CLUE}(t) = \emptyset \\ \sum_{clue \in CLUE(t)} \frac{V(t, c, O(\text{clue}))}{FRAMESIZE}, & \text{otherwise} \end{cases},$$

wherein CLUE(t) represents a set of clues after time t, V(t, c, O(clue)) stands for a visibility of clue object for camera c at time t, FRAMESIZE is frame area after rendering;
a second node cost function $L_E^N(t, c)$ related to character emotion intensity on camera c and represented by $$L_E^N(t, c) = \sum_{char} \left| \frac{\text{IntE}(t)}{\text{IntE}_{max}} - \frac{V_{face}(t, c, char)}{FRAMESIZE} \right|,$$

wherein IntE(t, char) represents emotion intensity for character char at time t, $V_{face}(t, c, char)$ stands for character char's facial visibility captured by camera c at time t, and $\text{IntE}_{max}$ denotes maximum emotion intensity; and
a third node cost function $L_C^N$ related to character conflict intensity on camera c and represented by:

$$L_C^N = \alpha \left| \frac{\text{IntC}(t, c)}{\text{IntC}_{max}} - Cont(t, c) \right|,$$

wherein IntC(t, c) refers to user-defined conflict intensity between groups at time t and Cont(t, c) describes a contrast in size for people from different groups.

11. The method according to claim 1, wherein the hop cost includes a first hop cost function $L_I^H(t_i, t_j)$ related to viewer perceived intensity and represented by:

$$L_I^H(t_i, t_j) = \alpha |(t_i - t_j) - d(t_i)|,$$

wherein $d(t_i)$ refers to an expected duration at time $t_i$, $\alpha$ is a coefficient to normalize the cost to a specific range and is adjusted in calculating a weighted sum of all hop cost functions.

12. A device of generating video in three-dimensional animation environment, comprising: a memory and a processor coupled to the memory and configured to perform:
obtaining and translating directorial hints for making a 3D animated movie based on user input;
determining camera configurations in a 3D environment according to the directorial hints;
establishing a camera search space that includes multiple candidate cameras to be used at different timestamps to shoot one or more scenes of the movie based on the camera configurations;
performing editing optimization based on the camera search space and the directorial hints, to obtain an edited video, wherein the editing optimization is formalized into a process of finding a path with minimum cost in a graph model, each path in the graph model describing a candidate camera sequence for producing the movie, and at least some of the directorial hints are translated into cost functions of the graph model; and
output the edited video as the produced 3D animated movie,
wherein:
a node $[t_i, c_u]$ in the graph model represents using a camera $c_u$ to shoot for time $t_i$;

an edge transitioning from [$t_i$, $c_u$] to [$t_j$, $c_v$] in the graph model represents from time $t_i$ to $t_j$, using camera $c_u$ for shooting, and a camera switch from $c_u$ to $c_v$ occurs at time $t_j$;

a hop ($t_i$, $t_j$) represents a time jump from $t_i$ to $t_j$ in the graph model;

the cost functions of the graph model includes: a node cost $L^N(t_i, c_u)$ representing a cost of using camera $c_u$ at time $t_i$, an edge cost $L^E(t_i, t_j, c_u, c_v)$ representing a cost of switching camera from $c_u$ to $c_v$ at time $t_j$, and a hop cost $L^H(t_i, t_j)$ representing a number of hops skipped by switching from time unit $t_i$ to time $t_j$, and a total cost function of the graph model is $$L(t_i,c_u)=\{L(t_j,c_v)+L^E(t_i,t_j,c_u,c_v)+\Sigma_{t_i\le t'<t_j}L^N(t',c_u)+L^H(t_i,t_j)\}.$$

13. The device according to claim 12, wherein obtaining the directorial hints comprises:
providing graphical interface tools to obtain the directorial hints, wherein types of the graphical interface tools include: a draggable curve interface, an action annotation interface, and a multiple choices interface.

14. The device according to claim 12, wherein the draggable curve interface is configured to obtain intensity related parameters, and the processor is further configured to perform:
obtaining a dragging operation on a point in an intensity curve displayed in the draggable curve interface;
adjusting an intensity trend surrounding the point based on the dragging operation; and
obtaining intensity parameters based on the adjusted intensity curve.

15. The device according to claim 14, wherein the intensity curve represents importance trend of events in the movie, each point on the intensity curve representing user defined importance of an event at a corresponding time period; and the processor is further configured to perform:
obtaining user annotations on an event group, the event group including multiple correlated events; and
adjusting importance levels of the correlated events to be equal to the highest importance of an event within the event group.

16. The device according to claim 12, wherein types of the directorial hints include at least two of protagonist hint, content trim related hints, clue hint, vibe related hint, directorial style related hint, or user add free camera.

17. The device according to claim 12, wherein:
the directorial hints includes a protagonist identified by the user in a scene; and
determining the camera configurations comprises: placing a camera to track the protagonist in the scene.

18. The device according to claim 12, wherein:
the directorial hints includes camera configuration groups learnt from previously made movies; and
determining the camera configurations comprises: placing multiple cameras in the 3D environment, each camera having settings from one of the camera configuration groups.

19. The device according to claim 12, further comprising:
generating an intermediate video from the editing optimization;
displaying the intermediate video in a video preview user interface;
obtaining adjusted directorial hints from the video preview user interface;
updating the graph model based on the adjusted directorial hints;
obtaining an updated camera sequence representing the minimum cost path in the updated graph model; and
displaying an updated video based on the updated camera sequence in the video preview user interface.

20. The device according to claim 19, wherein:
the adjusted directorial hints includes a camera added by the user to shoot for a specified time; and
obtaining an updated camera sequence representing the minimum cost path in the updated graph model comprises: forcing candidate paths of the graph model to go through a node representing the user added camera.

* * * * *